United States Patent
Ohashi et al.

(10) Patent No.: US 6,294,097 B1
(45) Date of Patent: Sep. 25, 2001

(54) METHOD FOR TREATING WASTE WATER CONTAINING NITRATE IONS

(75) Inventors: Michiya Ohashi, Akashi; Yoshimasa Katayama, Kobe, both of (JP)

(73) Assignee: Anan Kasei Co., Ltd., Hyogo-ken (JP)

( * ) Notice: Subject to any disclaimer, the term of this patent is extended or adjusted under 35 U.S.C. 154(b) by 0 days.

(21) Appl. No.: 09/445,787

(22) PCT Filed: Jun. 10, 1998

(86) PCT No.: PCT/JP98/02557
  § 371 Date: Dec. 10, 1999
  § 102(e) Date: Dec. 10, 1999

(87) PCT Pub. No.: WO98/57894
  PCT Pub. Date: Dec. 23, 1998

(30) Foreign Application Priority Data

Jun. 18, 1997 (JP) .................................................. 9-160922

(51) Int. Cl.$^7$ ..................................................... C02F 1/70
(52) U.S. Cl. .......................... 210/750; 210/757; 210/758; 210/766; 210/903; 423/237
(58) Field of Search .................. 210/750, 757, 210/758, 761, 762, 766, 903; 423/238, 237

(56) References Cited

U.S. PATENT DOCUMENTS

| 4,990,266 | * | 2/1991 | Vorlop et al. | 210/748 |
| 5,362,405 | * | 11/1994 | Birbara et al. | 210/763 |
| 5,460,734 | * | 10/1995 | Birbara et al. | 210/763 |

FOREIGN PATENT DOCUMENTS

| 52-007369 | 1/1977 | (JP) . |
| 62-052277 | 11/1987 | (JP) . |
| 01-040318 | 8/1989 | (JP) . |
| 08-309370 | 11/1996 | (JP) . |
| 52-022751 | 6/1997 | (JP) . |

* cited by examiner

Primary Examiner—Peter A. Hruskoci
(74) Attorney, Agent, or Firm—Darby & Darby

(57) ABSTRACT

There is disclosed a method for treating waste water containing nitrate ions by subjecting the waste water to decomposition and oxidation to eliminate a harmful gas, the method including the steps of: (a) mixing a waste water containing 10 to 90% by weight nitrate ions in terms of ammonium nitrate with a lower alcohol having 1 to 4 carbon atoms to prepare a mixture, (b) decomposing the mixture at a temperature of 250° C. or higher to generate a decomposition gas, and (c) reacting the decomposition gas with a gas containing oxygen at a temperature of 250° C. or higher to render the decomposition gas harmless.

5 Claims, 1 Drawing Sheet

METHOD FOR TREATING WASTE WATER CONTAINING NITRATE IONS

FIELD OF ART

The present invention relates to a method for treating, by decomposing, waste water containing nitrate ions such as ammonium nitrate or sodium nitrate, that is generated in various industries including non-ferrous metal refining and petrochemical industry, and in particular, to a method for treating waste water containing nitrate ions that is capable of rendering decomposition product gases generated during the decomposition harmless in an effective, stable manner.

BACKGROUND ART

Waste water containing nitrate ions such as ammonium nitrate or sodium nitrate is generated in various kinds of industries including non-ferrous metal refining and petrochemical industry. Such waste water containing nitrate ions has been treated by conventional methods known in the art including activated sludge process and thermal decomposition method.

The activated sludge process has been put into practice in sewage treatment plants. In this method, appropriate activation of the function of microorganisms requires control of the nitrogen compound concentration in the incoming waste water containing nitrate ions not to exceed 0.3% by weight in terms of ammonium nitrate. Thus, treatment of a waste water containing high concentration of nitrate ions necessitates a large amount of dilution water, vast area for treatment, expensive plants, and considerable treatment cost. Moreover, treatment of a large volume of sludge which has been generated poses another problem.

Ammonium nitrate, as an example of a nitrate ion source, is known to be thermally decomposed in accordance with the following formulae (Chemical Handbook (Kagaku Binran), Application, Third Edition, p115):

| | | |
|---|---|---|
| $NH_4NO_3 \rightarrow NH_3 + HNO_3$ | $-41$ kcal/mol (180° C.) | (1) |
| $NH_4NO_3 \rightarrow N_2O + 2H_2O$ | $+10$ kcal/mol (250° C.) | (2) |
| $2NH_4NO_3 \rightarrow 2N_2 + 4H_2O + O_2$ | $+28$ kcal/mol (300° C.) | (3) |
| $4NH_4NO_3 \rightarrow 2NO_2 + 8H_2O + 3N_2$ | $+27$ kcal/mol | (4) |

Heating a waste water containing ammonium nitrate induces decomposition of ammonium nitrate through the reactions represented by the formulae (1) and (2) stepwise depending on the temperature of the ammonium nitrate, thereby generating $HNO_3$ and $N_2O$, which cause formation of NOx. When the temperature for decomposition is lower, however, the reaction of the formula (1) proceeds in the reverse direction, resulting in recombined ammonium nitrate. In order to suppress the generation of the recombined ammonium nitrate and to decrease the decomposition gases, the temperature of ammonium nitrate should be rapidly raised to 300° C. or higher so that the reaction represented by the formula (3) proceeds. Thus, the conventional thermal decomposition method requires supply of the waste water by spraying into a decomposition furnace, while the furnace is kept at a temperature of not lower than 1000° C. to facilitate increase in temperature of the waste water. However, at a temperature of as high as not lower than 1000° C., nitrogen gas and oxygen react to form thermal NOx.

For overcoming such drawbacks, there has been proposed a two-stage decomposition method including the steps of decomposing ammonium nitrate at a lower temperature, and then further decomposing the resulting decomposition gas at a higher temperature.

One two-stage decomposition method known in the art follows the steps of spraying a concentrated ammonium nitrate solution into a heating furnace held at 180 to 210° C. to cause thermal decomposition, and then introducing the resulting decomposition gas into a decomposition furnace previously heated to 600 to 1000° C. for further decomposition (JP-52-22751A). This method, however, requires a decomposition furnace equipment that is resistant to a temperature of as high as 1000° C., and generates an exhaust gas containing as much as 0.4% NOx.

Another two-stage decomposition method known in the art for treatment of an ammonium nitrate waste water containing radioactive residue includes the steps of thermal-decomposing the waste water contained in a vessel in a primary decomposition furnace previously heated to 250 to 310° C., and then further decomposing the resulting recombined ammonium nitrate in a secondary decomposition furnace previously heated to 350 to 600° C. (JP-62-52277B). However, this method results in undesired generation of as much as 1.9% NOx since the decomposition temperature in the secondary decomposition furnace is maintained at a temperature of as low as 350 to 600° C. for preventing gassification and dispersion of the radioactive residue.

DISCLOSURE OF THE INVENTION

It is an object of the present invention to provide a method for treating waste water containing nitrate ions which is capable of effecting the treatment at a lower temperature than the conventional thermal decomposition method, and which is capable of suppressing the generation of harmful gases such as NOx at a lower level and rendering the gases harmless.

The present inventors have made intensive studies, seeking a method for decomposing at a lower temperature $HNO_3$ and $N_2O$ that have been generated as a result of decomposition of ammonium nitrate through the reactions according to the formulae (1) and (2). They have taken notice of reactions of $HNO_3$ and $N_2O$ with alcohol, and found out that the above problems may be solved even at a temperature lower than the conventional decomposition temperature by adding a particular lower alcohol to a waste water of a particular concentration in terms of ammonium nitrate, and subjecting the resulting mixture to a treatment at a temperature exceeding a particular level, thereby completing the present invention.

According to the present invention, there is provided a method for treating waste water containing nitrate ions by subjecting the waste water to decomposition and oxidation to eliminate a harmful gas, the method comprising the steps of:

(a) mixing a waste water containing 10 to 90% by weight nitrate ions in terms of ammonium nitrate with a lower alcohol having 1 to 4 carbon atoms to prepare a mixture, (b) spraying said mixture into a decomposition furnace held at a temperature of 250° C. or higher to decompose said mixture to generate a decomposition gas, and (c) reacting said decomposition gas with a gas containing oxygen at a temperature of 250° C. or higher to render said decomposition gas harmless.

PREFERRED EMBODIMENTS OF THE INVENTION

Figure 1:
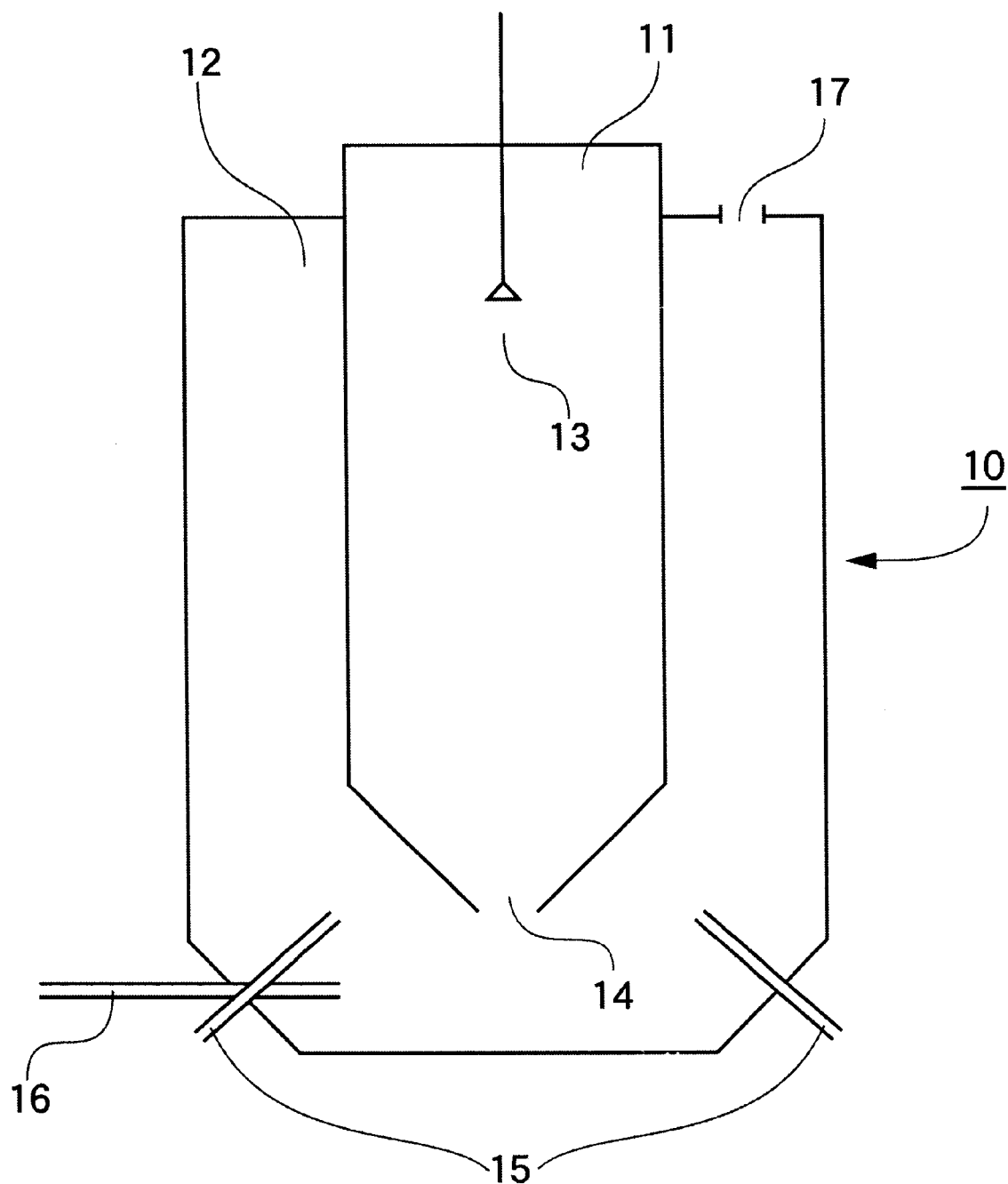
FIG. 1 is an illustrative schematic view of a decomposition reactor used in Examples and Comparative Examples.

The waste water containing nitrate ions that can be treated with the method of the present invention is those containing a solution of a nitric acid salt such as ammonium nitrate, sodium nitrate, potassium nitrate, calcium nitrate, or mixtures thereof, and is not particularly limited as long as the concentration of the nitrate ions contained in the waste water falls in the range of 10 to 90% by weight in terms of ammonium nitrate. For example, a waste water having the nitrate ion concentration of less than 10% by weight may be subjected to the present method after it is concentrated to the nitrate ion concentration of 10% by weight or higher in terms of ammonium nitrate by evaporating the water component.

The nitrate ion concentration of the waste water containing nitrate ions is 10 to 90% by weight in terms of ammonium nitrate as mentioned above. A lower water content is more advantageous for the decomposition, while too low a water content causes precipitation of a nitrate to impair the efficiency in the decomposition. Thus, the nitrate ion concentration is preferably 20 to 80% by weight, more preferably 40 to 80% by weight. Concentration of the waste water containing nitrate ions may be effected by a conventional method, and the heat source for the method may be the waste heat generated by practicing the method of the present invention for effective use thereof.

According to the method of the present invention, step (a) of mixing the waste water containing nitrate ions with a lower alcohol having 1 to 4 carbon atoms, is carried out to thereby obtain a mixture of the waste water and the lower alcohol.

The lower alcohol having 1 to 4 carbon atoms may be selected from the group consisting of methyl alcohol, ethyl alcohol, propyl alcohol, butyl alcohol, and mixtures thereof. It is preferred to select methyl alcohol alone, or a mixture containing methyl alcohol.

The content of the lower alcohol may be suitably selected depending on the amount of decomposition gases to be generated, and usually not less than 10% by weight, preferably 10 to 50% by weight of the total amount of the waste water and the lower alcohol together. In particular, when methyl alcohol is used, the content thereof is most preferably 10 to 20% by weight.

According to the method of the present invention, the mixture prepared in step (a) is subjected to step (b) of decomposing the mixture at a temperature above the particular level to generate a decomposition gas.

The following description will be made with the waste water containing nitrate ions being represented by a waste water containing ammonium nitrate ions, and the lower alcohol to be added being represented by methyl alcohol.

Step (b) is usually carried out in a decomposition furnace without oxygen supply from outside. The mixture introduced into the decomposition furnace, which is maintained at a temperature above the particular level, is converted to ammonium nitrate mist, gasified alcohol vapor, and water vapor, and, while the temperature is being raised, decomposition reactions of ammonium nitrate (the reactions represented by the formulae (1) to (4)) and other reactions (when methyl alcohol is used, reactions represented by the following formulae (5) to (8)) are believed to be effected.

$$HNO_3+CH_3OH \rightarrow CH_3NO_3+H_2O \tag{5}$$

$$3N_2O+CH_3OH \rightarrow 3N_2+CO_2+2H_2O \tag{6}$$

$$2CH_3NO_3 \rightarrow N_2+CO_2+CO+3H_2O \tag{7}$$

$$2NO_2+4CO \rightarrow N_2+4CO_2 \tag{8}$$

The occurrence ratio of the reactions represented by the formulae (1) to (8) varies depending on the concentration of ammonium nitrate, the amount of the alcohol added, the velocity of the mixture spraying, the temperature in the decomposition furnace, and the like conditions. An amount of the harmful gases in the decomposition gases can be reduced by optimization of these conditions.

Harmful $HNO_3$ and $N_2O$ generated during the decomposition reactions of the mixture prepared in step (a) at a temperature above the particular level are immediately reacted with the lower alcohol in the mixture according to the formulae (5) and (6) to be decomposed further.

These decomposition reactions may be effected, for example, by supplying as required the mixture prepared in step (a) to a decomposition furnace held at a temperature above the predetermined level. Preferably, the mixture is sprayed into the decomposition furnace held at a temperature above the predetermined level in order to raise rapidly the temperature of the mixture to exceed the predetermined temperature. In this case, if excess oxygen is present in the decomposition furnace, the reaction represented by the formula (9) takes precedence, hindering efficient formation of CH3NO3 and decomposition of $N_2O$.

$$2CH_3OH+3O_2 \rightarrow 2CO_2+4H_2O \tag{9}$$

Therefore, the atmosphere in the decomposition furnace is preferably composed of a vaporized gases of the mixture, decomposition gases of the mixture, or a mixture of such gases.

In step (b), the temperature above the predetermined level may be achieved by heating through a method which is capable of supplying the quantity of heat required for the reactions without introducing excess oxygen into the furnace. For instance, heating may be effected using electricity, natural gases, propane gas, kerosene, or heavy oil. It is particularly preferred to heat the decomposition furnace from outside.

For the decomposition reactions of the mixture prepared in step (a), the temperature should be raised to 250° C. or higher. If the temperature is lower than 250° C., the reaction speed will be too slow to effect sufficient decomposition reactions, resulting in formation of a large amount of undecomposed gases. Taking the efficiency of the decomposition reactions and downsizing of the decomposition furnace into account, thetemperatureispreferably 300° C. or higher, more preferably 500° C. or higher. The maximum temperature for the decomposition reactions is not particularly restricted, but would be about 800° C., so that a high-temperature-resistant decomposition furnace is not required.

According to the present invention, the decomposition gases generated in step (b) are subjected to step (c) of reacting the decomposition gases with a gas containing oxygen at a temperature above the particular level to render the decomposition gases harmless.

It is believed that $NH_3$ and CO, which are particularly harmful among the decomposition gases generated in step (b), undergo the reactions represented by the formulae (10) and (11) to be rendered harmless.

$$4NH_3+3O_2 \rightarrow 2N_2+6H_2O \tag{10}$$

$$2CO+O_2 \rightarrow 2CO_2 \tag{11}$$

In this step, the oxygen-containing gas to be used is not particularly limited as long as the gas is capable of oxidizing the decomposition gases generated in step (b), and may preferably be, for example, air, an oxygen gas, or a mixed gas of an inert gas and an oxygen gas.

The temperature for the reactions of the decomposition gases generated in step (b) with the oxygen-containing gas is not particularly limited as long as it is 250 ° C. or higher, at which the reactions represented by the formulae (10) and (11) can be initiated. The temperature is preferably 300° C. or higher, more preferably 500° C. or higher. The maximum temperature is preferably less than 1300° C., at which thermal NOx is generated. For the purpose of eliminating the need for a high-temperature-resistant oxidation furnace, the maximum temperature is preferably 1000° C., more preferably 800° C.

The reactions of the decomposition gases generated in step (b) with the oxygen-containing gas may be effected by heating through any method that is capable of supplying the quantity of heat required for initiation of the reactions. For example, heating may be effected using electricity, natural gases, propane gas, kerosene, or heavy oil. The furnace for the oxidation may be heated either from outside or directly from inside.

In the method of the present invention, the structure of the decomposition furnace used in step (b) and the oxidation furnace used in step (c) is not particularly limited as long as the decomposition gases generated in the decomposition furnace are introduced into the oxidation furnace. For instance, the two furnaces may be arranged in separate systems in which the decomposition furnace and the oxidation furnace have their own heating apparatus, and are connected with each other via a duct, or in an integral system in which the decomposition furnace is located inside the oxidation furnace, and the two furnaces share a common heat source. Each system may furthec-be provided with a means for treating the exhaust gas, such as a dust collector, a gas filter, or a wash-column. For example, when a wash-column employing calcium hydroxide as its cleaning liquid is used, $CO_2$ in the exhaust gas may be removed. Such means for treating the exhaust gas may be disposed in a gas passageway between the decomposition furnace and the oxidation furnace and in an outgoing gas passageway from the oxidation furnace in the case of the separate systems mentioned above, or in an outgoing gas passageway from the oxidation furnace in the case of the integral system mentioned above.

According to the method of the present invention, the waste water containing nitrate ions is mixed with the particular alcohol, and then subjected to the decomposition reactions and the oxidation reactions. Thus, even at a lower temperature, the amount of NOx and $NH_3$ in the exhaust gas generated in decomposition reactions can be reduced sufficiently. This leads to great improvement in the plant cost, the plant life and the treatment cost, compared to the conventional method.

EXAMPLES

The present invention will now be explained in detail with reference to Examples and Comparative Examples, but the present invention is not limited to these.

It is noted that the measurement: of NOx, $NH_3$, and CO in exhaust gases in the Examples and Comparative Examples is carried out with "Vacuum Gas Sampler AP-400", "NOx detector tube", "$NH_3$ detector tube", and "CO detector tube", all manufactured by KOMYO RIKA-GAKU KOGYO K.K.

Example 1

9 liter of a waste water containing 45% by weight ammonium nitrate was mixed with methyl alcohol in an amount of 10% by weight of the total amount of the waste water and the methyl alcohol together, thereby preparing a waste water mixture containing methyl alcohol. The mixture was then subjected to decomposition reactions and oxidation reactions in a reactor 10 as shown in FIG. 1.

The reactor 10 is provided with a decomposition furnace 11 having a diameter of 300 mm and a height of 650 mm and an oxidation furnace 12 having a diameter of 500 mm and a height of 800 mm. The decomposition furnace 11 has at the top thereof a spray nozzle 13 which is adjusted to spraying a predetermined amount of the waste water, and at the bottom thereof an introduction port 14 for introducing decomposition gases into the oxidation furnace 12. As shown in FIG. 1, the oxidation furnace 12 is provided, through the side wall in the bottom portion thereof, with LPG burners 15, which are oriented toward the side wall in the bottom portion of the decomposition furnace. An air inlet line 16 is disposed horizontally in the bottom portion of the oxidation furnace 12. At the top of the oxidation furnace 12 is located a discharge port 17.

The decomposition reactions were effected by spraying the waste water mixture containing methyl alcohol through the spray nozzle 13 into the interior of the decomposition furnace 11 at the flow rate of 200 ml/min, while the interior of the decomposition furnace 11 and the oxidation furnace 12 is maintained at 700° C. with the LPG burners 15. The oxidation reactions were effected by injecting air through the air inlet line 16 into the oxidation furnace 12, which had been previously heated to 700° C. After the spraying, no explosion was recognized, and the decomposition and oxidation reactions proceeded in a stable manner. It was determined that the exhaust gas resulting from the decomposition and oxidation reactions and discharged through the discharge port 17 contained 130 ppm of NOx and no $NH_3$ and CO.

Example 2

8 liter of a waste water containing 66% by weight ammonium nitrate was mixed with methyl alcohol in an amount of 20% by weight of the total aitount of the waste water and the methyl alcohol together, thereby preparing a waste water mixture containing methyl alcohol. The mixture was then sprayed in the same way as in Example 1 for decomposition and oxidation reactions, except that the interior of the decomposition and oxidation furnaces 11, 12 was maintained at 350° C. After the spraying, no explosion was recognized, and the reactions proceeded in a stable manner. It was determined that the exhaust gas resulting from the reactions and discharged through the discharge port 17 contained 200 ppm of NOx, 40 ppm of $NH_3$, and no CO.

Example 3

7 liter of a waste water containing 66% by weight ammonium nitrate was mixed with ethyl alcohol in an amount of 30% by weight of the total amount of the waste water and the ethyl alcohol together, thereby preparing a waste water mixture. The mixture was then sprayed in the same way as in Example 1 for decomposition and oxidation reactions. After the spraying, no explosion was recognized, and the reactions proceeded in a stable manner. It was determined that the exhaust gas discharged through the discharge port 17 contained 220 ppm of NOx, 60 ppm of $NH_3$, and no Co. Example 4

10 liter of a waste water containing 55% by weight sodium nitrate in terms of ammonium nitrate was mixed with methyl alcohol in an amount of 15% by weight of the total amount of the waste water and the methyl alcohol together, thereby preparing a waste water mixture.

The mixture was then sprayed in the same way as in Example 1 for decomposition and oxidation reactions, into a reactor assembled by adding so the reactor 10 used in Example 1 a wash-column for cleaning the gas discharged through the discharge porft 17. After the spraying, no explosion was recognized, and the reactions proceeded in a stable manner. It was determined that the exhaust gas discharged from the wash-column contained 230 ppm of NOx and no $NH_3$ and CO.

Comparative Example 1

The reactions were effected in the same way as in Example 1, except that a waste water containing 45% by weight ammonium nitrate without methyl alcohol added was sprayed in place of the waste water mixture containing methyl alcohol. It was determined that the exhaust gas discharged through the discharge port 17 contained 2500 ppm of NOx and 900 ppm of $NH_3$, and white fume was emitted, which was believed to be recombined ammonium nitrate. Comparative Example 2

A waste water containing 40% by weight ammonium nitrate was sprayed as it was through the spray nozzle 13 at the flow rate of 200 ml/min into the decomposition furnace 11 held at 1000° C. for decomposition reactions. It was determined that the exhaust gas discharged through the discharge port 17 contained 1300 ppm of NOx and 200 ppm of $NH_3$, and white fume was emitted, which was believed to be recombined ammonium nitrate.

Comparative Example 3

Decomposition reactions were effected in the same way as in Example 1, except that no air was introduced into the oxidation furnace 12. It was determined that the exhaust gas discharged through the discharge port 17 contained 120 ppm of NOx, 620 ppr, of $NH_3$, and 8000 ppm of CO.

What is claimed is:

1. A method for treating waste water containing nitrate ions by subjecting the waste water to decomposition and oxidation to eliminate a harmfiul gas, said method comprising the steps of:

(a) mixing a waste water containing 10% to 90% by weight nitrate ions in terms of ammonium nitrate with a lower alcohol having 1 to 4 carbon atoms to prepare a mixture, wherein an amount of said lower alcohol to be mixed is 10 to 50% by weight of a total amount of said waste water and said lower alcohol together, (b) spraying said mixture into a decomposition furnace held at a temperature of 250° C. or higher to decompose said mixture to generate a decomposition gas, and (c) reacting said decomposition gas with a gas containing oxygen at a temperature of 250° C. or higher to render said decomposition gas harmless.

2. The method of claim 1 wherein said lower alcohol comprises methyl alcohol.

3. The method of claim 1 where no in said step (b), said decomposition furnace is held at a temperature in a range of 300° C. to 800° C.

4. The method of claim 1 wherein said step (c) for rendering the decomposition gas harmless is effected by reacting said decomposition gas generated in step (b) with said gas containing oxygen in an oxidation furnace held at a temperature in a rance of 300 to 800° C.

5. The method of claim 1 wherein said gas containing oxygen in said step (c) is air.

\* \* \* \* \*